United States Patent [19]

Davis

[11] Patent Number: 5,114,447
[45] Date of Patent: May 19, 1992

[54] ULTRA-HIGH EFFICIENCY POROUS METAL FILTER

[75] Inventor: Christopher B. Davis, Suffield, Conn.

[73] Assignee: Mott Metallurgical Corporation, Farmington, Conn.

[21] Appl. No.: 665,963

[22] Filed: Mar. 12, 1991

[51] Int. Cl.⁵ .................. B01D 46/12; B01D 39/20
[52] U.S. Cl. ...................... 55/485; 55/482; 55/523; 210/510.1
[58] Field of Search ........... 55/485, 523, 482; 210/486, 488, 510.1

[56] References Cited

U.S. PATENT DOCUMENTS

| | | | |
|---|---|---|---|
| 2,430,078 | 11/1947 | Reinsch et al. | 210/510.1 X |
| 2,826,805 | 3/1958 | Probst et al. | 210/510.1 X |
| 2,997,777 | 8/1961 | Davies | 210/510.1 X |
| 3,557,536 | 1/1971 | Ririe | 55/523 X |
| 3,581,902 | 6/1971 | Bidler | 210/510.1 X |
| 3,853,504 | 12/1974 | Buscher et al. | 55/485 X |
| 3,950,152 | 4/1976 | Guon | 55/523 X |
| 4,637,877 | 1/1987 | Hartmann et al. | 55/523 X |
| 4,686,041 | 8/1987 | Van den Berg et al. | 55/485 X |
| 4,687,579 | 8/1987 | Bergman | 55/523 X |
| 4,758,272 | 7/1988 | Pierotti et al. | 55/523 X |
| 4,793,922 | 12/1988 | Morton | 55/485 X |
| 4,886,533 | 12/1989 | Sakashita et al. | 55/523 X |
| 4,902,314 | 2/1990 | Mizukami et al. | 55/523 X |
| 4,902,319 | 2/1990 | Kato et al. | 55/523 |

FOREIGN PATENT DOCUMENTS

| | | | |
|---|---|---|---|
| 3413213 | 10/1985 | Fed. Rep. of Germany | 55/523 |
| 873926 | 7/1942 | France | 55/523 |
| 1242214 | 7/1986 | U.S.S.R. | 55/523 |

*Primary Examiner*—Robert Spitzer
*Attorney, Agent, or Firm*—Chilton, Alix & Van Kirk

[57] ABSTRACT

An ultra-high efficiency particulate air filter for use in the microelectronics manufacturing industry is formed as a fully homogeneous sintered metal filter that exhibits an efficiency substantially in excess of a 6 log reduction and preferably equal to or exceeding a 9 log reduction (an efficiency of 99.9999999%). The filter can be used as a process gas in-line filter in state of the art gas supply systems. The porous metal filter exhibits long term stability relative to mechanical or thermal stress and operates within the desired ultra-high efficiency levels even under high pressure conditions. It does not exhibit an outgassing problem and there is no particle shedding. These features are provided within a unit no larger than those conventionally employed heretofore with organic membranes and under substantially identical operating conditions.

18 Claims, 3 Drawing Sheets

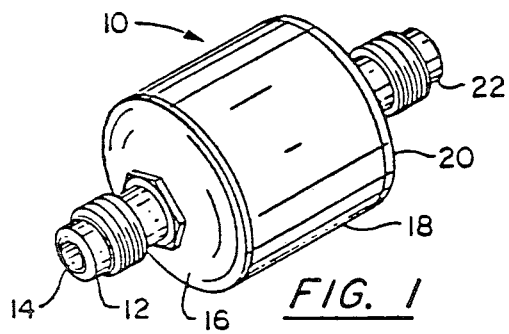
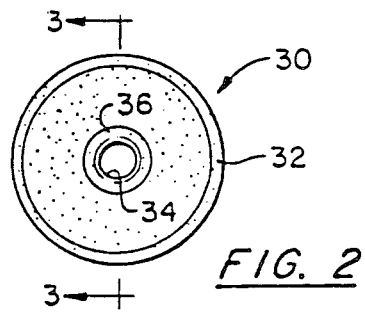
FIG. 1
FIG. 2
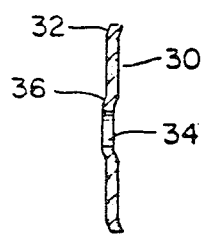
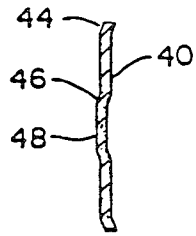
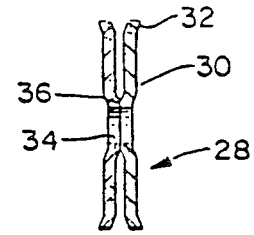
FIG. 3
FIG. 4
FIG. 5
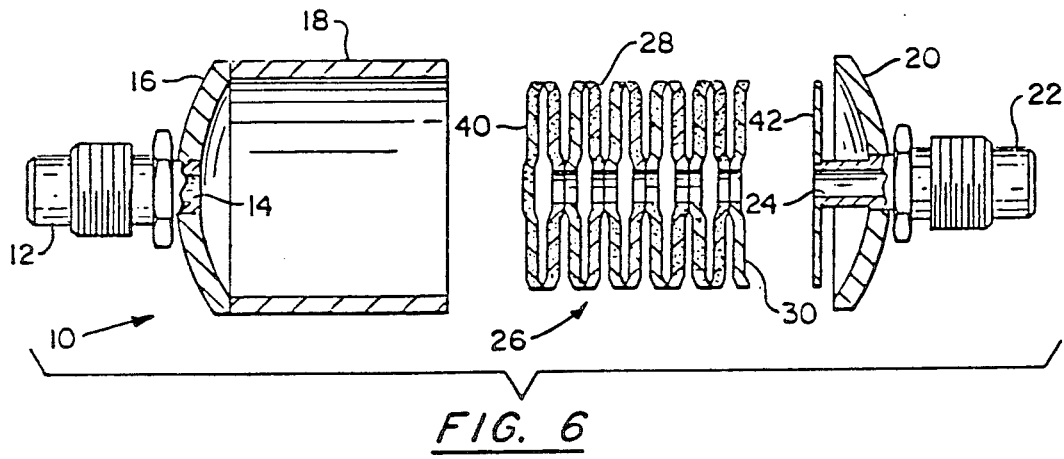
FIG. 6
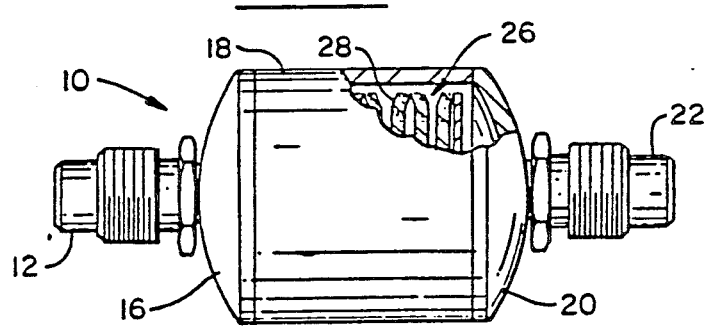
FIG. 7

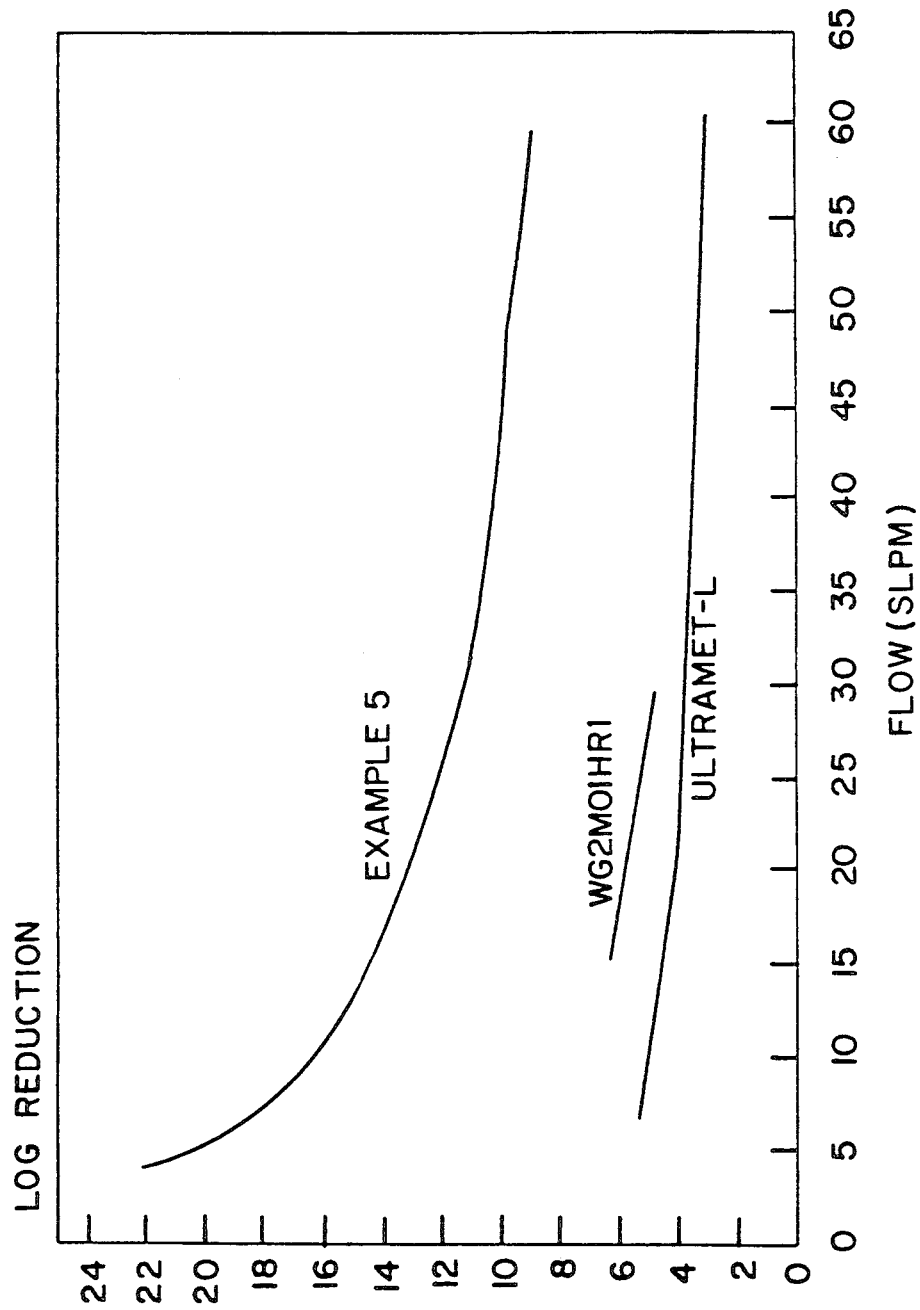

ULTRA-HIGH EFFICIENCY POROUS METAL FILTER

BACKGROUND AND SUMMARY OF THE INVENTION

The present invention relates generally to particulate air filters and is more particularly concerned with a new and improved ultra-high efficiency porous metal filter of the type described.

In the semiconductor and microelectronics manufacturing industry, as well as in other industries, it has become necessary to provide a high purity environment that goes far beyond the conventional capabilities of high efficiency particulate air (HEPA) filters. To achieve this it has been necessary to incorporate filtration systems into the process gases lines employed in these industries. These in-line filtration systems target the elimination of not only particulates, but also moisture and organic materials from the environment where semiconductors and integrated circuits are manufactured and/or assembled. To meet these requirements the filters used in these systems must not only remove all particles present within an incoming or process gas stream but also most avoid inadvertent contamination of the atmosphere or contributing thereto by discharging contaminates as a result of desorption (outgasing) of moisture, oxygen or organic materials.

While thin organic membrane filters have been used successfully for gas filtration in these industries for many years, it has been recognized that an ultra-high efficiency filter of enhanced ruggedness and stability, as well as the ability to withstand elevated temperatures, would be desirable. Enhanced mechanical and chemical stability characteristics have been achieved in some inorganic membrane filtration systems used for filtering liquid streams but thus far such filters have not been satisfactorily produced for use as particulate air filters. The inorganic membrane filters are formed by coating a porous substrate or support with an inorganic membrane coating material. However, such inorganic membrane structures provide a sufficiently small pore size only on the upstream or feed side of the filter and possess much larger pores over the remainder of the filter's thickness. Even thicker more homogenous inorganic filters, such as ceramic or stainless steel filters have not been successful in matching the high efficiency exhibited by the organic membrane filters, namely, filtration efficiency levels greater than 99.999% (referred to as a 5 log reduction in particle penetration since the number of particles penetrating the filter is less than one in $10^5$).

The ultra-high efficiency particulative filters made from organic membranes have achieved a resistance to particle penetration in excess of a 6 log reduction and even up to and beyond the 9 log reduction level (efficiency greater than 99.9999999%). Organic membranes exhibiting the highest efficiencies have generally been prepared from mixed esters of cellulose, polyvinylidine fluoride or fluorinated hydrocarbons, such as Teflon. However, such materials can not withstand elevated temperatures and are subject to outgassing under certain conditions.

Since even minute traces of gaseous or aerosol impurities may cause haze and defects on a silicon wafer, thus degrading yield and reliability, it is essential that both the process gasses and the environment be maintained in as pure a state as possible by eliminating impurity levels down to less than one part per million (a 6 log reduction) and preferably to less than one part per billion (a 9 log reduction). To succeed in keeping the process gases that clean at their point of use requires not only the use of very clean gas supplies as starting materials but also ultra-clean distribution systems and in-line repurification and filtration at their point of use. Since organic filters exhibit the inherit property of shedding coupled with contaminant outgasing, it is desirable to provide alternative filters that are not subject to these drawbacks yet provide the same ultra-high efficiency levels.

For the more critical processes involving the manufacture of submicron devices, inorganic filters can have many advantages over organic membrane filters. Problems that traditionally plagued organic membrane filters, namely, particle shedding, organic desorption (outgasing), clogging, and thermal degradation can be avoided with inorganic filters. Such materials are structurally strong and do not stretch so pore size can be defined more accurately than with polymeric membranes. Typically, the inorganic filter will not flex in high or pulse flows and therefor is less susceptible to shedding or particle loss. These materials also exhibit long term stability relative to shock, vibration and thermal stress. Such materials can operate under service conditions up to about 450° C., as well as under high pressure conditions. While ceramic filters fulfill many of these desirable characteristics, unfortunately they typically cannot withstand temperatures above 200° due to the presence of teflon seals used thereon. Stainless steel filters made from stainless steel fibers also show potential but likewise fail when measured against the efficiencies of the organic membranes.

It has now been found, in accordance with the present invention, that porous metal filters made as fully homogeneous structures from stainless steel, nickel and nickel based alloys and the like exhibit an efficiency substantially in excess of a 6 log reduction. These filters can be produced for use as process gas in-line filters in state of the art gas supply systems. The porous metal filters of the present invention exhibits long term stability relative to mechanical or thermal stress and operate within the desired ultra-high efficiency levels even under high pressure conditions. As is typical of metal filters they do not exhibit an outgassing problem and there is no particle shedding. Of particular importance is the fact that they exhibit these features within a unit no larger than those conventionally employed heretofore with organic membranes and under substantially identical operating conditions.

Other advantages will be in part obvious and in part pointed out more in detail hereinafter.

A better understanding of the objects, advantages and relationships of the invention will be obtained from the following detailed description of not only the several steps of the process together with the relation of one or more of such steps with respect to each of the others, but also the article possessing the features, properties and relation of elements exemplified therein and in the accompanying drawings which set forth an illustrative embodiment and are indicative of the various ways in which the principles of the invention are employed.

BRIEF DESCRIPTION OF THE DRAWINGS

In the Drawings

FIG. 1 is a perspective view of a gas line filter unit incorporating the features of the present invention.

FIG. 2 is a top plan view of a filter disc employed within the filter assembly of FIG. 1.

FIG. 3 is a sectional view of the disc of FIG. 3, taken along the line 3—3.

FIG. 4 is a sectional view similar to FIG. 3 of an end filter disc employed in the filter assembly of FIG. 1.

FIG. 5 is a sectional view similar to FIG. 3 of a filter 1.

FIG. 6 is an exploded view of the filter assembly of FIG. 1 with the main body portion thereof shown in longitudinal cross section.

FIG. 7 is side elevational view of the assembly of FIG. 1, partially broken away and partially in section.

FIG. 9 is a graph comparing the log reduction of the filter of the present invention with two commercially available filters.

DESCRIPTION OF A PREFERRED EMBODIMENT

Figure 8:
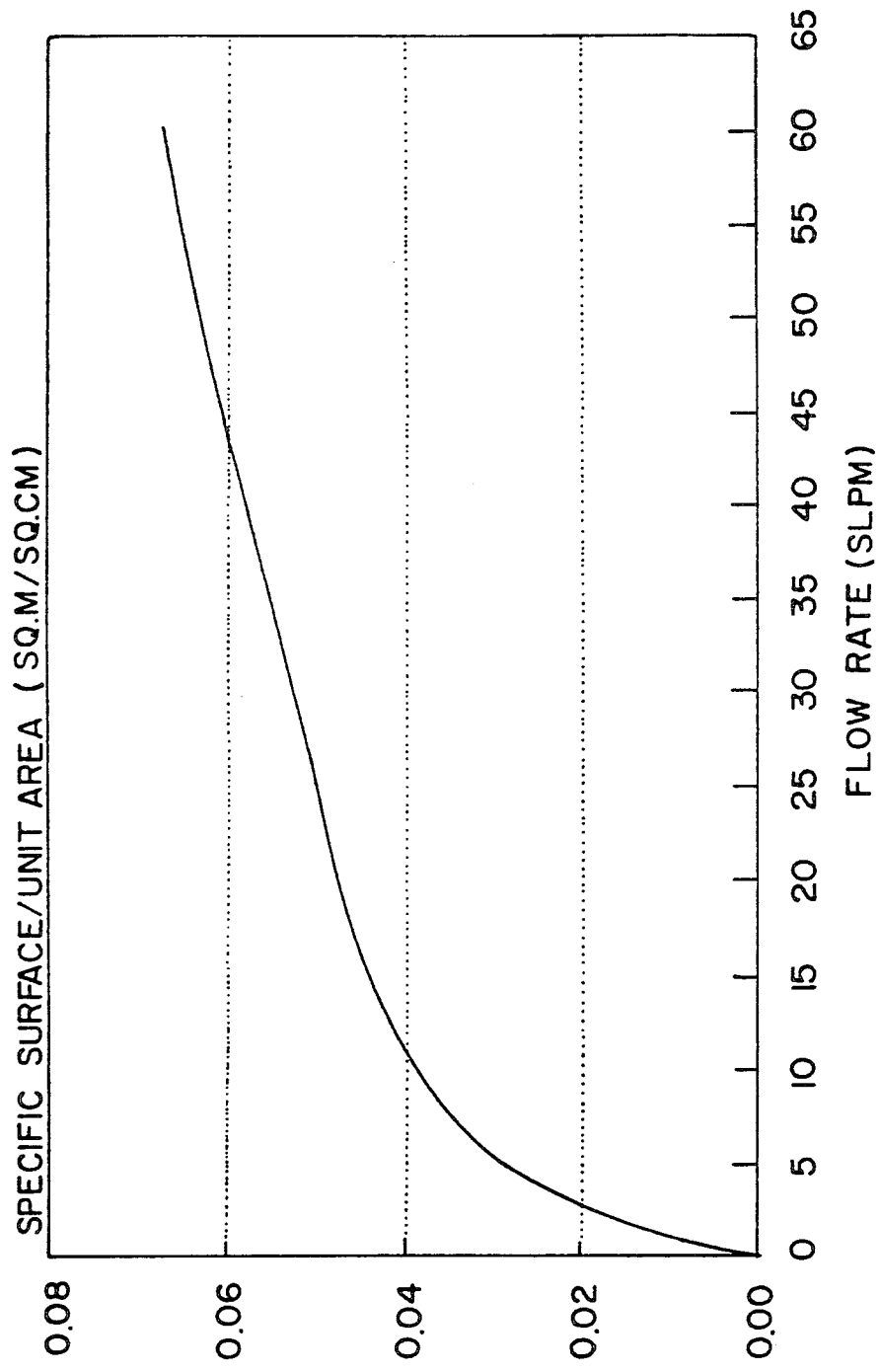
FIG. 8 is a graph plotting the specific surface area of the filters necessary to provide a 9 log reduction at various flow rates.

Referring now to the drawing in greater detail wherein like reference numerals indicate like parts throughout the several figures, the present invention is illustrated as taking the form of an in-line filter unit for filtering process gasses, air and the like. The filter unit 10 includes a threaded inlet stem 12 having a central bore 14 therein acting as an inlet port for communication with upstream gasses flowing through the system. The stem passes through and is sealably connected to a dome shaped end cap 16 which in turn mates with and is integrally connected to one end of a cylindrical central shell portion 18. The opposite end of the shell 18 is similarly connected to an outlet end cap 20 through which is mounted a threaded gas outlet stem 22 with a central outlet port 24 extending therethrough. The entire structure is gas tight and finished to avoid any contaminant inadvertently entering the unit.

Housed within the cylindrical shell portion 18 is a stacked cell filter assembly 26, as shown in FIGS. 6 and 7. The assembly 26 is comprised of a plurality of dual-disc filter cells 28, see FIG. 5, appropriately interconnected via appropriate seals, such as electron beam or equivalent seals, and mounted on the outlet stem 22 of the downstream end cap assembly.

The filter cells 28 are comprised of a pair of axially apertured sintered metal filter elements or disks 30 of the type illustrated in FIGS. 2 and 3. The generally planar disks are flared slightly in a first lateral direction at their outer periphery 32 and in an opposite lateral direction adjacent their central aperture 34. The disks are oriented relative to each other so that the flared portions 36 at the apertures 34 are in intimate contact and firmly secured or bonded to each other to form the filter cell structure 28 shown in FIG. 5. The peripherally flared portions 32 of each cell 28 are secured, as mentioned, to complimentary portions 32 on adjacent cells to build up to the stacked assembly 26 shown in FIG. 6. An assembly-terminating porous disk 40 is mounted at the free end of the cell assembly 26 while the opposite end thereof is intimately secured to a solid disk 42 secured to the stem 22 of the outlet end cap assembly so that the interior of the stacked cell assembly communicates with the outlet port 24. As shown in FIG. 4, the terminating disk 40 is substantially identical to the disks 30 with the exception of the central aperture. The disk 40 is provided with a peripheral flare 44 and central oppositely extending flare 46 but includes a continuous central planar portion 48 in place of the control aperture 34 of disks 30. As shown in FIG. 6, the peripheral flare 44 is electron beam welded to the flare 32 of the adjacent cell 28 to seal the stacked cell assembly.

As will appreciated, the foregoing stacked cell filter assembly 26 is simply illustrative of one manner in which the filtered disks 30 and 40 of the present invention may be arranged in order to provide the desired filtration efficiency for the in-line process gas filtered unit. The number and diameter of the cells 28 in each assembly may vary so long as the unit can be accommodated by the system. For example a filter unit rated at a flow of 30 standard liters per minute (SLPM) may have a filter housing cavity of only about 1.3 inches in length and diameter, with an overall length for the unit being slightly less than 3.5 inches. However, the primary filtration efficiency characteristics are built into the sintered metal filter disks used in the assembly and it is primarily the characteristic of the disk elements that provide the desired efficiency for the entire unit.

The disk elements are sintered metal members made from fine powders of stainless steel or other corrosive resistant materials. These sintered metal filters are substantially homogeneous throughout as contrasted with the single surface membranes mentioned hereinbefore and exhibit a filter efficiency of greater than a 6 log reduction and preferably equal to or exceeding a 9 log reduction level. Although no fully accepted standards exist for grading and evaluating ultra-high efficiency particularly air filters, the techniques described by Rubow, Liu and Grant in their 1988 publication "Characteristics of Ultra-High Efficiency Membrane Filters in Gas Applications", Journal of Environmental Sciences, Vol. 31 pages 26-30 (May 1988), provides a reasonable approach based on the use of test particles that encompass the most penetrating particle size for the filter medium and test conditions. As indicated in that publication for small particles, the particle penetration tends first to increase with increasing particle size and then decreases with further increases in particle size. Thus, there exists a particle size of maximum penetration (equivalent to minimum capture efficiency or worst case scenario for the filter) designated as the "most penetrating particle size" (mpps). The mpps for the filter elements of the present invention is approximately 0.1 microns. As flow velocity increases, the mpps tends to decrease slightly and penetration increases. Therefore, the efficiency of the filters is best expressed in terms of fractional penetration by the mpps. Fractional penetration is defined as the ratio of the particle concentration at the filter exit to the particle concentration at the filter inlet. The fractional penetration increases as flow velocity increases and therefore it is important to indicate the flow at which the filter evidences a particular efficiency level. Since most commercial filters can be conveniently rated at flow rates of 30 standard liters per minute (SLPM) that flow has been selected as a bench mark for defining the effectiveness of the filters of the present invention.

The effectiveness or efficiency of the filter will also vary with the thickness of the filter. Therefore, the filter elements of the present invention are best defined in terms of their characteristics at a standard thickness. For purposes of the porous sintered metal filter elements described herein, a standard thickness of 0.173 cm. (0.068 inch) has been found to provide reproducible data. Additionally, the pressure drop through the filter should not be excessive for the particular system in which the filter is to be employed. At a flow rate of 30 SLPM, the pressure drop should not substantially exceed 15 psid and preferably should be no greater than 10 psid based on ambient pressure at the filter unit exit.

In accordance with the present invention, the porous sintered metal filters found most effective are best defined by their specific surface area per unit area under the standard conditions set forth hereinbefore, namely a flow rate of 30 SLPM at a thickness of 0.173 cm. Under these conditions, the filter should exhibit a specific surface area per unit area of at least 0.055 sq. meters per sq. centimeter. Where the filter element exhibits greater than this minimum value, it will provide the desired 9 log reduction (an efficiency greater than 99.9999999%). In this connection, the filter element of the present invention is defined by the curve in FIG. 8 that plots flow rate against the specific surface necessary to achieve a 9 log reduction. Filter elements that possess a specific surface value above the line will provide greater than the desired 9 log reduction. For example, for a filter area of 11.3 in.$^2$ a specific surface greater than 0.03 m$^2$/cm$^2$ at a flow rate of only 5 SLPM is equivalent to the 0.055 m$^2$/cm$^2$ at 30 SLPM.

As contrasted with filters utilized heretofore, the filter element of the present invention is formed as a substantially homogeneous porous sintered metal disk. The disk is made from very fine powdered material, i.e., material having a mean particle size well below 20 microns and preferably about 10 microns and less. As will be appreciated, the particular size will vary with the specific type of material employed. Grade 316L stainless steel having a mean particle size of 5 to 9, and preferably about 7 microns, has has been found to produce excellent results. Other materials such as the corrosion resistant nickel based alloy, Hastelloy C-22, or very fine nickel 255 powder may also be used with good success. Powders having a particle size well below 10 microns will increase filtration efficiency as the size decreases.

The metal powder is typically added to a mold for the disk, having for example a diameter of 1.22 inches, is pressed to provide a disk having a thickness within the range of 0.04 to 0.12 inch and then sintered for about 30–45 minutes to provide the desired filter element. For the preferred materials a minimum sintered thickness of about 0.06 inch will provide good results. The green thickness of the compacted powder generally is less critical than the density of the material after sintering, although the two are obviously interrelated. A sintered density greater than 5.0 g/cc is typically sought. It will of course be understood that the compaction must be sufficient so that following sintering the powder particles are permanently held in place. The apparent density of the pre-sintered powder is about 2.4 g/cc for the stainless steel and Hastelloy and about 0.5–0.65 g/cc for the powdered nickel. Compaction also should result in an isopropyl alcohol bubble point of at least about 8 inches of Hg for the sintered stainless steel filter element.

The compacted disks are sintered in a hydrogen atmosphere at a temperature and for a time sufficient to promote only enough sinter-neck growth to hold the powder in place. Minimum sintering is preferred. As the degree of sintering decreases, flow through the filter will increase for a given differential pressure and the filtration efficiency will increase. For nickel powder sintering temperatures of about 1600°–1650° F. provide good results while temperatures between about 1900° F. and 2100° F. are used with stainless steel powder and Hastelloy. It should be kept in mind that when the metal powder is substantially larger than the desired 10 micron size mentioned hereinbefore, higher temperatures are required and the efficiency of the resulting filter element is significantly reduced. As mentioned, the sintered element should exhibit the specific surface values set forth hereinbefore.

Particle penetration tests for the various filters can be performed utilizing the test procedures and equipment described in the aforementioned Rubow et al publication. Typically, tests are conducted at the standard flow rate of 30 SLPM although other rates may also be used. The test aerosols are polydispersed sodium chloride (NaCl) particles with a median particle size of about 0.1 microns since this particle size constitutes the most penetrating particle size for the sintered metal filters. When conducting such tests, it is generally preferred to perform the test so as to minimize particle loading of the filter in order to ascertain the best possible particle penetration through new clean filter units. Particle capture or efficiency is known to increase with particle loading.

The test system used for measuring the particle penetration is a condensation nucleus counter (CNC) since it is capable of detecting particles from 0.014 to 1.0 microns. The aerosol generation system includes a collision type atomizer and a particle charge neutralizer. The test aerosols are passed through a krypton-85 charged neutralizer and the aerosol concentrations upstream and downstream of the test filter are measured with the CNC particle counters. Three CNC's are used to continuously monitor the upstream and downstream aerosol concentrations. The upstream and downstream concentration measurements are made simultaneously to eliminate any uncertainty caused by fluctuation in the aerosol concentration.

The air flow rate to the test filter is measured using two laminar flow elements of different ranges. The flow rate is determined by measuring the pressure drop across the laminar flow element which is uniquely related to the volumetric air flow rate.

The experimental test procedure consists of first measuring the pressure drop across the new filter as a function of air flow rate followed by the particle penetration measurements. For the pressure drop test, clean filtered air is passed through the test filter at various flow rates and the corresponding filter pressure drop measured. The test aerosol is introduced to the filter and the aerosol concentration upstream and downstream of the filter is measured simultaneously using the CNC particle counters.

As mentioned, the overall configuration of the filtering unit preferably should be such as to readily replace the organic membrane filtering units utilized herefor. These units have generalized standards as to the length and diameter or width within the semiconductor industry. In that industry, units having a rated flow up to 30 SLPM typically have an overall total length between 3¼ and 3½ inches, with most units exhibiting an overall length of 3.3 inches. Units that are rated up to 300 SLPM will typically have an overall length of about five inches. As will be appreciated, these standards are simply guide lines so as to make the product more adaptable to existing equipment. Similarly, the diameter of the unit should be small enough to allow the gas cabinet plumbing to be as close as possible to the unit.

Typically, an outside diameter of 1.75 inches will conveniently fit into existing cabinet arrangements.

The filter unit of the present invention is not only gas tight, but must be capable of withstanding gas cylinder pressures that typically fall in the range of 2500 to 3500 psi. Accordingly, the housings within the unit are preferably constructed of stainless steel or a similar material capable of withstanding these pressure levels. Of course, where one is not confined by a preexisting system, the filter unit can be significantly larger. For example, units rated at 1400 SLPM have been fabricated in lengths just short of two feet with diameters of four to five inches. Such larger units generally have a lower pressure rating due to the size of the housing and the significantly larger amount of porous filter material incorporated within the housing.

Having generally described the invention, the following examples are given in order that the effectiveness of the invention may be more readily and fully understood. These examples are set forth for purposes of illustration only and are not intended in any way to limit the practice of the invention. Unless otherwise specified, all parts are set forth on a weight basis.

EXAMPLE 1

Porous sintered stainless steel disks were prepared using 316L stainless steel powder having a mean particle size of 7.2 microns and an apparent density of 2.4 grams per cubic centimeter. The disks were compressed and sintered in a 100% hydrogen atmosphere for thirty minutes to provide a sintered thickness of 0.067 inches and a sintered density of 5.4 g/cc. The disks exhibited a diameter of 1.21 inches and a weight of 6.8 grams. The disk was tested for filter efficiency at a gas flow rate of 30 standard liters per minute for a filter area of 11.3 in.$^2$ and provided greater than a 9 log reduction according to the test procedure set forth hereinbefore using sodium chloride challenge particles.

EXAMPLE 2

The procedure of Example 1 was repeated except that the thickness of the disk was varied from 0.023 inch to 0.042 inch. Corrected to a thickness of 0.068 inches, the material all exhibited a specific surface per unit area greater than 0.06 square meters per square centimeters and a log reduction greater than 9 log, as shown in Table I.

TABLE I

| Sample | Thickness (in.) | Fract. Penn. | Log Reduction | Log Reduction Corrected to .068" | Density (G/CC) | Specific Surface @ .068 (m$^2$/cm$^2$) |
| --- | --- | --- | --- | --- | --- | --- |
| 2-A | 0.0235 | 7.4e−04 | 3.13 | 9.06 | 5.1704 | 0.0645 |
| 2-B | 0.0310 | 6.7E−05 | 4.17 | 9.16 | 5.3106 | 0.0688 |
| 2-C | 0.0420 | 2.4E−06 | 5.62 | 9.10 | 5.1378 | 0.0653 |

EXAMPLE 3

The procedure of Example 1 was repeated except that the stainless steel powder was replaced by a nickel base alloy powder, Hastalloy C22, and the sintering temperature was increased to about 2050° F. The material exhibited a sintered thickness falling within the range of 0.068 to 0.072 inches, a sintered density within the range of 5.85 to 6.15 g/cc and a bubble point in the range of 8-9 in Hg.

The procedure of example 1 was repeated using nickel 255 having a mean particle size in the range of two to three microns. At a thickness of 0.06 inches the filter disk exhibited a sintered density of 5.8 to 6.0 g/cc. The sintered disk exhibited a bubble point in the range of 10-12 in. Hg. In both instances, the disks provided greater than a 9 log reduction when corrected to a thickness of 0.068", and 0.060" respectfully.

EXAMPLE 4 f tiltering unit was assembled from the stainless steel disks made according to Example 1. The unit had the configuration shown in the drawings. The resulting filter unit was tested for average pressure drop over an air flow rate ranging from 2-30 SLPM and showed a pressure drop varying from 0.36 to 8.8 psid based on ambient pressure at the filter unit exit. The unit was also tested for particle penetration efficiency at flow rates of 30 and 45 SLPM. The data resulting from these tests is set forth in Table II.

TABLE II

| Test | 4-A | 4-B |
| --- | --- | --- |
| Air Flow Rate[1], (SLPM) | 30 | 45 |
| Pressure Drop[1], (psid) | 9.3 | 12.0 |
| Challenge Particle Concentration[2], (part/cm$^3$) | 1.1e6 | 6.0e5 |
| Downstream Particle Concentration during Particle Challenge[3], (part/cm$^3$) | <5e−4 | <5e−4 |
| Downstream Particles Detected | 0 | 0 |
| Particle Penetration[3] | <4e−10 | <8e−10 |
| Log Reduction[4] | >9.4 | >9.0 |

[1] Based on ambient pressure at filter unit exit.
[2] Challenge aerosol was polydisperse NaCl with a number mediam diameter of 0.1 um and geometric standard deviation 2.
[3] No particles detected downstream of filter during 3.3 min particle challenge test.
[4] Log Reduction = Log (1/Particle Penetration)

EXAMPLE 5

A filter unit prepared in accordance with Example 4 was evaluated in comparison to a commercial stainless steel filter, the Waferguard II SF mini inline gas filter sold by Millipore and designated as Catalog No. WG2M 01H Rand a commercial stainless steel fiber filter ULTRAMET-L GASKLEEN filter assembly sold by Pall Corp.

When the Waferguard II filter was tested at flow rates of 15 and 30 SLPM, the pressure drop was recorded as 6.3 and 11.1 at the respective flow rates. The efficiency rating for the filter is set forth in FIG. 9 and clearly evidences a log reduction well below 6 log at the flow rate of 30 SLPM but slightly above 6 log at 15 SLPM.

The ULTRAMET-L filter was similarly tested at flow rates ranging from 7.5 to 60 standard liters per minute. Over that range, it exhibited a pressure drop of from 1.16 to 7.8 psid. An efficiency rate for the stainless steel fiber filter was below 4 log at a flow rate of 30 SLPM.

As will be apparent to persons skilled in the art, various modifications, adaptations and variations of the foregoing specific disclosure can be made without departing from the teachings of the present invention.

I claim:

1. An ultra-high efficiency particulate air filter for use in filtering process gases for the semiconductor and microelectronics manufacturing industries comprising a filter element made from porous sintered metal, said element having a filtration efficiency relative to its most penetrating particle size of at least 6 log reduction and a specific surface per unit area of at least 0.055 $m^2/cm^2$ when standardized to a thickness of 0.068 inch, said filtration efficiency being measured at a flow rate of 30 SLPM for an 11.3 $in.^2$ filter area.

2. The particulate air filter of claim 1 wherein said sintered metal element is formed from metal powder having a presintered mean particle size of less than 20 microns.

3. The particulate air filter of claim 2 wherein the mean particle size is less than 10 microns.

4. The particulate air filter of claim 1 wherein the sintered element has a density of at least 5 g/cc and an isopropyl alcohol bubble point of at least 8 inches Hg.

5. The particulate air filter of claim 1 wherein the sintered metal element has undergone a degree of sintering sufficient to hold all powder particles therein during use.

6. The particulate air filter of claim 1 wherein the sintered metal element has undergone a degree of sintering sufficient to withstand sinter-neck reduction.

7. The particulate air filter of claim 1 having a pressure drop of less than 15 psid at a rated flow of 30 SLPM existing at atmospheric pressure.

8. The particulate air filter of claim 1 wherein the metal is selected from the group consisting of stainless steel, nickel and nickel alloys.

9. The particulate air filter of claim 1 wherein the filter element comprises a plurality of filter members stacked therein in such a manner as to provide a porous surface area at least about seven times the volume occupied by the filter element.

10. The particulate air filter of claim 1 wherein the element has an efficiency of at least a 9 log reduction.

11. An ultra-high efficiency particulate air filter comprising a filter element of porous sintered metal powder having a presintered mean particle size substantially less than 20 microns and a sintered density of at least 5 g/cc., the filter element having been sintered to a degree sufficient to hold the metal powder permanently in position and less than would cause reduction in filtration efficiency below 99.9999%.

12. The filter of claim 11 having a filtration efficiency that is at least a 6 log reduction when measured at a flow rate of 30 SLPM.

13. The filter of claim 12 wherein the efficiency is at last a 9 log reduction.

14. The filter of claim 11 wherein the filter element has a specific surface per unit area of at least 0.55 $m^2/cm^2$ when standardized to a thickness of 0.068 inch.

15. The filter of claim 11 having a pressure drop of less than 15 psid at a rated flow of 30 SLPM exiting at atmospheric pressure.

16. The filter of claim 11 wherein the particle size is less than 10 microns.

17. The particulate air filter of claim 11 wherein the metal powder is selected from the group consisting of stainless steel, nickel and nickel alloys.

18. The particulate air filter of claim 11 wherein the filter element comprises a plurality of filter members stacked therein in such a manner as to provide a porous surface are at least about seven times the volume occupied by the filter element.

* * * * *

UNITED STATES PATENT AND TRADEMARK OFFICE
CERTIFICATE OF CORRECTION

PATENT NO. : 5,114,447
DATED : May 19, 1992
INVENTOR(S) : Christopher B. Davis It is certified that error appears in the above-identified patent and that said Letters Patent is hereby corrected as shown below:

Column 10, line 20, change "last" to -- least --.

Column 10, line 22, change "0.55" to -- .055 --.

Column 10, line 35, change "are" to -- area --.

Signed and Sealed this

Nineteenth Day of October, 1993

Attest:

BRUCE LEHMAN

Attesting Officer      Commissioner of Patents and Trademarks

UNITED STATES PATENT AND TRADEMARK OFFICE
Certificate

Patent No. 5,114,447            Patented: May 19, 1992

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Christopher B. Davis, Dallas, Tex. and Kenneth L. Rubow, Farmington, Conn.

Signed and Sealed this Twenty-fourth Day of March, 1998.

JAY H. WOO
*Supervisory Patent Examiner*
Patent Examining Art Unit 1305